United States Patent [19]

Fillar

[11] Patent Number: 4,932,927
[45] Date of Patent: Jun. 12, 1990

[54] HIGH STRENGTH, NON-METALLIC TRANSMISSION CHAIN

[75] Inventor: John A. Fillar, New Berlin, Wis.
[73] Assignee: Envirex Inc., Waukesha, Wis.
[21] Appl. No.: 175,620
[22] Filed: Mar. 25, 1988

Related U.S. Application Data

[63] Continuation of Ser. No. 840,116, Mar. 14, 1986, abandoned.

[51] Int. Cl.$^5$ ............... F16G 13/06; F16G 15/12
[52] U.S. Cl. .................. 474/207; 59/84; 474/227; 474/228
[58] Field of Search ........... 474/206, 207, 227, 219, 474/222–226, 228–231, 234; 59/84, 90; 98/850–853

[56] References Cited

U.S. PATENT DOCUMENTS

| | | | |
|---|---|---|---|
| 237,771 | 2/1881 | Paine | 474/227 |
| 304,325 | 9/1884 | Howe | 474/228 |
| 617,137 | 3/1899 | Anthony | 198/851 |
| 633,738 | 9/1899 | Sheldrick | 474/228 |
| 2,816,453 | 12/1957 | Frank et al. | 74/251 |
| 2,915,909 | 12/1959 | Boron | 474/227 |
| 3,056,706 | 10/1962 | Knoppel | 154/43 |
| 3,153,898 | 10/1964 | Gerhardt | 59/84 |
| 3,231,069 | 1/1966 | Lanham | 198/189 |
| 3,733,811 | 5/1973 | Florjancic | 59/35 |
| 4,123,947 | 11/1978 | Smith et al. | 74/245 |
| 4,198,814 | 4/1980 | Schoenick | 59/84 |
| 4,250,764 | 2/1981 | Grant | 474/207 |
| 4,271,663 | 6/1981 | Templin et al. | 59/84 |
| 4,272,952 | 6/1981 | Graham | 59/84 |
| 4,552,035 | 11/1985 | Skipper | 74/581 |
| 4,757,681 | 7/1988 | Matsuno et al. | 59/84 |

FOREIGN PATENT DOCUMENTS

| | | | |
|---|---|---|---|
| 730408 | 3/1966 | Canada | 474/207 |
| 1036590 | 8/1958 | Fed. Rep. of Germany . | |
| 1135721 | 8/1962 | Fed. Rep. of Germany . | |
| 3408295 | 10/1985 | Fed. Rep. of Germany | 59/84 |
| 3475 | 3/1887 | United Kingdom | 474/227 |
| 19971 | 9/1896 | United Kingdom | 474/227 |
| 2117084 | 10/1983 | United Kingdom . | |

OTHER PUBLICATIONS

Bulletin 1158, Jeffrey Manufacturing Div., Dresser Industries "Acetal Resin thermoplastic/SS Chain for Sludge Collector Service", 1978.

*Primary Examiner*—Hoang C. Dang
*Attorney, Agent, or Firm*—Michael, Best & Friedrich

[57] ABSTRACT

A link assembly for a lightweight, non-metallic, conveyor or load transmission chain having significantly greater strength and other performance improvements compared to previous non-metallic chain links is disclosed. Each link assembly includes: a pair of identical sidebars each comprised of high-strength filamentary material wound in an elongated loop configuration and fixed in a matrix of hardened resin; a connecting pin having a stiff reinforced composite core and a skin-tight sleee of non-abrasive material; low friction bushing means between the sidebars and connecting pin; and retaining means for holding the assembly together.

Methods of making the unique sidebar and connecting pin components are also disclosed.

37 Claims, 3 Drawing Sheets

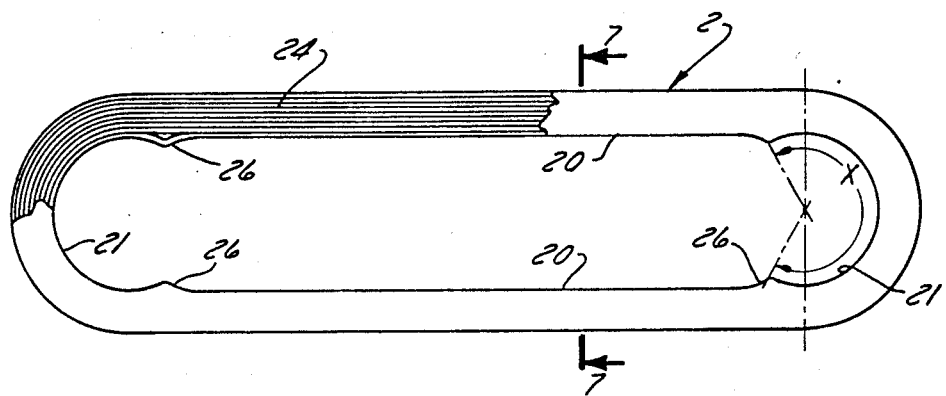
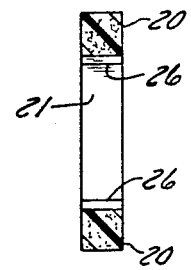
FIG. 6    FIG. 7
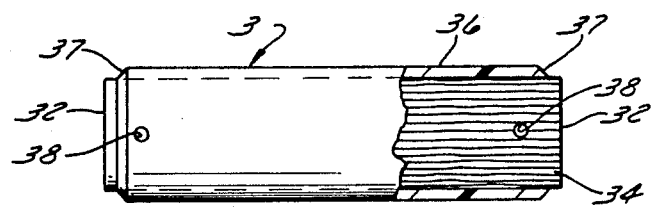
FIG. 8
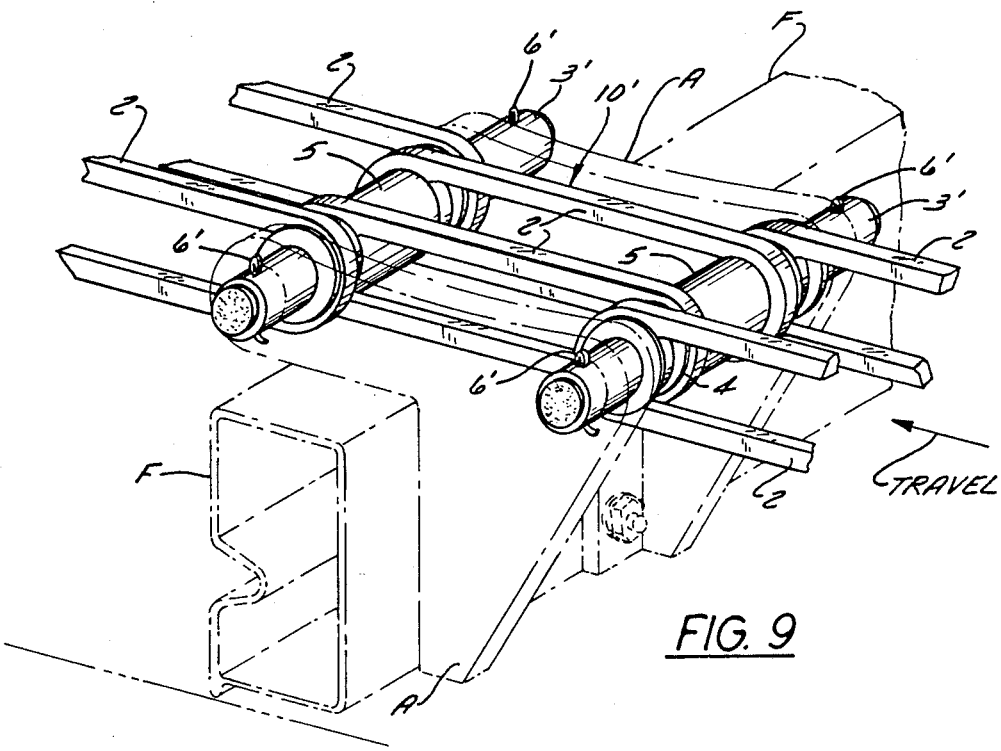
FIG. 9

HIGH STRENGTH, NON-METALLIC TRANSMISSION CHAIN

This is a continuation of application Ser. No. 840,116, filed on Mar. 14, 1986, now abandoned.

FIELD OF THE INVENTION

This invention relates to non-metallic, high-load transmission or conveyor chain and, more particularly, to an improved, all plastic, high strength-to-weight ratio chain link assembly especially well suited for sludge collector chain used in sewage treatment plants.

BACKGROUND OF THE INVENTION

Imagine a power transmission or conveyor chain made of an economical, corrosion resistant material, yet having a very high strength-to-weight ratio. There are indeed a broad range of applications for such a chain wherever either of those properties are important. For example, in grain and cement elevators, the weight of the chain used to lift bulk materials is itself a major contributor to the load on itself and the drive system. In food processing or underwater operations, corrosion resistance is an essential requirement.

Chain made in accordance with the invention can be used advantageously in those and other applications to transmit heavy loads in a hostile corrosive environment. However, it was initially developed to satisfy a long standing need for an improved sludge collector chain to operate under conditions where both basic properties, as well as dimensional stability, are extremely important.

Sludge collector chains are typically employed in pairs of parallel strands which between them support elongated flights. The flights travel under the pull of the chains to scrape the accumulated sludge settled along the bottom of a sewage treatment tank. Such tanks typically range in length up to 350 feet, and in depth up to 15 to 20 feet. The sprocket driven, submerged chains for these tanks are quite long, endure heavy tensile loads and operate in a corrosive environment.

Initially sludge collector chain was formed of malleable cast iron which was very heavy and unwieldly, required considerable power to drive it, and was vulnerable to corrosion by most wastewater. Such cast chain is still used in many larger settling tanks because of the heretofore unavailability of a non-metallic chain having adequate pulling strength.

In more recent times chain manufacturers have struggled to replace the heavy cast metal with corrosion resistant non-metallic materials, particularly plastics. Plastic chain offers the advantage of lower weight which thereby reduces chain load, power consumption, wear, and installation costs. Although a few of these plastic chains, representatives of which are discussed below, have proven acceptable in some smaller sludge collector applications, none of the heretofore commercially available ones have had enough strength to operate in the larger tanks.

U.S. Pat. Nos. 4,123,947 and 4,250,764 are illustrative of typical plastic sludge collector chains in use today. These chains comprise a series of single piece, hermaphroditic links made of a synthetic resin and connected together by non-metallic pins. The chain design shown and discussed in U.S. Pat. No. 4,272,952 is similar except that the chain link is comprised of two identical half links permanently joined together. The complexly shaped links of these prior chains are made by injection molding.

The success of these previous plastic sludge collector chains has been limited primarily because of their limited pulling strength. None of these commercial chains has an ultimate breaking strength greater than about 7,000 lbs. force, and therefore these chains can only be used in lighter duty applications. None come close to having a strength approaching that of cast iron chain.

As mentioned variously in the aforementioned patents, persons skilled in the art heretofore recognized that higher strengths could be achieved with glass fiber reinforced resin or equivalent composites; but they were constrained in their effective use of such composites by concerns that:

a. such stronger composites cannot be molded into the complex shape of conventional sludge collector chain;

b. such composites were too highly abrasive and therefore produce excessive wear on mating parts; or c. that any conceptually suitable composite chain design would be too costly.

The plastic chain links shown in the three aforementioned patents have in common with their predecessor cast metal chains, a complex shape including curved sidebars with widened bearing surfaces or edges intended to engage annular rims on so-called "chainsaver" sprockets. The only practical method of forming synthetic resins into such intricate shapes is by molding, typically injection molding. The types of reinforcement that can be used effectively in injection molding is limited. In the case of fibers, they must be discontinuous and usually fairly short. Also, because the fibers flow with the resin in the mold, it is difficult to control their final orientation to effect maximum reinforcement.

However, the prevailing property needed in a material for the links themselves, and particularly the sidebars, is tensile strength. In the case of fiber reinforced materials, the optimum tensile strength results when the high strength filaments are aligned parallel to the direction of pull, and particularly if the filaments are continuous.

The art of filament winding a ring or looped member to take advantage of the foregoing reinforcement principle was tried on other kinds of chain. The patentees of U.S. Pat. Nos. 3,153,898 and 3,744,811 employed a filament wound, fiber reinforced plastic to make links for an anchor chain "with a strength surpassing that of welded steel". However, this type of chain is not subject to repeated cyclical articulation between connected links, and therefore not vulnerable to wear due to the abrasiveness of the composites. Accordingly, this anchor chain technology is not readily transferable to articulating conveyor chain such as sludge collector chain.

German Patent No. 1,135,721 illustrates and discloses a sprocket driven transmission type chain having sidebars with filament wound, reinforced plastic cores. The sidebars are formed by winding filaments through a slit in a loop-shaped mold when which then becomes a non-abrasive jacket for the finished link. It is not known to me if this chain construction was ever developed to a successful commercial product, or, if so, for what kind of application. However, it is apparent that it was never adapted to a design for sludge collector chain, as evidenced by the later issued U.S. Pat. Nos. 4,123,947; 4,250,764 and 4,272,952, which represent the practical state-of-the-art. Furthermore, as will be more apparent from the detailed description of the present invention, the method of making a chain as taught in German Patent No. 1,135,721 is too costly to be competitive with the chain and process taught herein.

Thus, despite the existence of some knowledge of using filament winding to reinforce plastic links for chain, the designers of conveyor chain, particularly sludge collector chain, struggled along until now with the material constraints imposed by their conventional wisdom dedicated to a classified configuration which required molding. They occupied themselves with improving pin characteristics or connectibility between links, and apparently conceded that a truly high strength chain of this type couldn't be made at a realistic cost.

It is therefore a principal object of the present invention to provide a chain link assembly for a truly high strength, non-metallic transmission or conveyor chain at a competitive cost.

It is a more specific objective of the present invention to provide a commercially affordable non-metallic chain link assembly suitable for sludge collector chain, which is stronger than any of the previously available non-metallic chains suitable for that application.

It is another object of the present invention to provide a link assembly having sidebars of a non-metallic material reinforced with high strength filamentary material oriented to maximize the tensile strength of the sidebar to yield a chain having a high strength-to-weight ratio.

It is another object of the invention to provide a plastic chain having strong and long lasting sidebars and connecting pins separated by and assembled with low cost replaceable wear members.

It is another object of the present invention to provide a high strength plastic chain link assembly comprising multiple components which is easily assembled, dissassembled and/or connected to other links, without the need of special tools.

It is a further object of the invention to provide a method of forming high-strength, filament wound reinforced plastic sidebars for a transmission or conveyor chain link.

It is a still further object of the invention to provide a method of making a high-strength, non-abrasive, reinforced plastic connecting pin for a transmission or conveyor chain.

SUMMARY OF INVENTION

The foregoing and other objectives are met by a chain link assembly, made in accordance with the invention, comprising several easily assembleable, design-balanced components, each with optimum properties for their respective functions in the assembled link. A pair of identical sidebars, in the form of symmetrical elongated open loops, are each made of a hardened resin reinforced with continuous, high-strength filamentary material wound in the configuration of the loop to optimize the pulling strength of the sidebar. A pin, for connecting one end of the pair of sidebars to a pair of similar sidebars in an adjacent link, comprises a cylindrical body of hardened resin reinforced with longitudinally extending, high-strength filamentary material distributed uniformly across its cross-sectional area. As a further enhancement of its properties and function, the connecting pin is provided with a tight fitting, formed-in-place plastic sleeve to provide a non-abrasive, low-friction, bearing surface.

To prevent abrasion between the sidebars and the connecting pin, relatively inexpensive wear members made of low friction plastic materials are provided and act as permanently lubricated bushings. The connecting pin rotates freely in all such bushings. As a further feature of the chain link assembly a separate cylindrical roller, also made of a low friction polymeric material, is disposed about the connecting pin between the sidebars, to provide a freely rotatable and low wearing interface with the sprockets used to drive the chain. The chain link is held together by mechanical retaining means, also preferably of a corrosion resistant material, at the ends of the connecting pin.

A sludge collector chain made of such link assemblies is not only lightweight and resistant to corrosion, but offers the important additional advantages of significantly higher pulling strength and dimensional stability than the plastic chains used heretofore. Moreoever it can be easily assembled using only a conventional tool for the retaining means and can be reconditioned by replacing the relatively inexpensive wear members while reusing the more costly structural components.

The superior strength of the improved chain link assembly is achieved at a feasible cost in a competitive market by reason of the unique design of the sidebars and connecting pin and the methods of making them. The process for forming the sidebar comprises wetting a continuous strand or strands of high strength filamentary material with a hardenable, thermosetting, liquid resin, convolutely winding the wetted strand or strands under tension in a continuous loop at a substantially 90° angle and curing the resin to form a matrix which fixes the taut strands.

This process allows the production of a sidebar having a near perfect alignment of the filamentary reinforcement to provide maximum tensile strength. It lends itself to the production of such sidebars at a mass production rate. In addition it permits the simultaneous formation of small projections of resin on the inner surface of the sidebar. These projections serve to readily locate and longitudinally fix the associated bushing elements to insure that the proper chain pitch is maintained even during slackened operating conditions.

The connecting pin is made by first forming a cylindrical core of hardened resin encapsulating longitudinally taut strands of high strength filamentary material, such as by a pultrusion process. Then a thin tube of low friction plastic material is formed separately, placed about the core while at an elevated temperature, and shrunk upon cooling into a skin-tight non-slipping sleeve which functions as a non-abrasive bearing surface.

BRIEF DESCRIPTION OF THE DRAWINGS

Having thus briefly described the invention in its broader aspects, additional advantages and features are now discussed in more detail with reference to the accompanying drawings, which form part of this specification, and of which:

FIG. 6 is a side elevational view of one of the sidebars of the link assembly of FIGS. 1–5;

FIG. 7 is a cross-sectional view through the link sidebar of FIG. 6 as taken along the line 7—7 in FIG. 6;

FIG. 8 is a side elevational view, partly in cross-section, of the connecting pin of the link assembly of FIGS. 1–5; and FIG. 9 is an isometric view of a chain link embodying the invention, but modified to accept a pair of attachments (shown in phantom) for a sludge collector flight.

Figure 1:
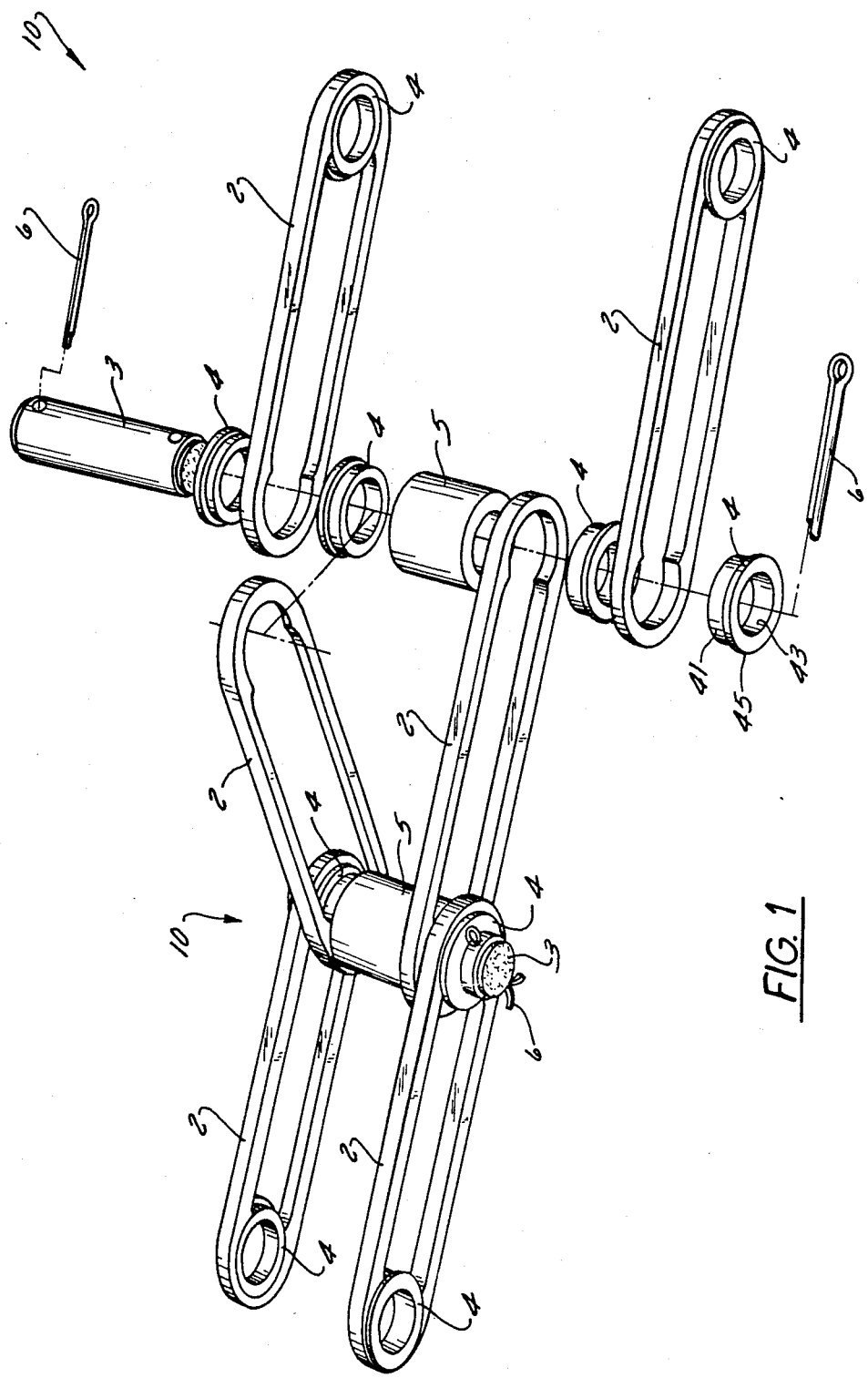
FIG. 1 is a partially exploded isometric view, showing a chain link assembly in accordance with the present invention in both an assembled condition and an adjacent like assembly in an exploded, condition to display its various components.

The chain link assembly, which is indicated generally by the numeral 10 in FIGS. 1 through 5, consists of two identical sidebars 2, a connecting pin 3, four bushings 4, a roller 5 and two cotter pins 6.

Referring to FIGS. 6 and 7, the typical sidebar 2 is in the shape of a flattened open loop having a pair of straight and parallel center sections 20 integrally connected by curved end sections 21. The sidebar is comprised of an unshielded hardened resin matrix reinforced by high tensile strength, continuous filaments 24 which have been wound in parallel paths around the loop. The filaments 24 are evenly distributed across the rectangular cross-section of the sidebar. Since the loads applied on the sidebars 2 are opposed pulling forces applied at the respective curved ends of the sidebar 2 generally parallel to the center sections 20, the aforementioned composite material maximizes the tensile strength of the sidebar. It has been observed that the open loop configuration is stronger than one having a web filling the center of the loop, such as might be suggested by the molded shapes of earlier sludge collector chains, because of the reduction of stress concentration points.

While the particular resin chosen for the sidebar 2 will depend on certain application and cost considerations, as well as its compatibility with the reinforcement chosen, thermosetting polyester and epoxy resins are generally preferred. Similarly, while glass filaments are probably the most affordable today, other high strength filamentary materials, such as steel, carbon or aramid, could be used if economically available. The reinforcement 24 is preferably a strand or roving of continuous or substantially continuous filaments, and a textured strand may be used if delamination is a concern.

In one tested embodiment of the invention, a sidebar having an epoxy resin matrix with 60–80% by weight glass fiber reinforcement produced excellent test results and field performance.

The sidebar 2 is formed by convolutely winding the reinforcement 24, which has been wetted with uncured resin, under tension, about a mandrel until the desired width and thickness is built up. The resin is then cured to permanently fix the taut filaments in place. The winding is preferably done at a consistent 90° angle of wind (with respect to the axis of rotation of the mandrel) and that the filamentary reinforcement is near perfectly aligned parallel with the loop. It is an added feature of this method that by using a wide mandrel, a wide flattened filament wound tube can be formed and then sliced into predetermined widths to yield a plurality of sidebars on an economically large batch basis. This method of making filament wound sidebars lends itself to higher production rates and is clearly more economical than the process described in German Patent No. 1,135,721.

The curved section 21 of the symmetrical sidebar 2 has a semicircular inside surface for the seating of a bushing 4. By providing small grooves in the forming mandrel, resin is squeezed into the grooves during the winding operation. When cured, the sidebars are thus formed with integral, inwardly extending projections 26 of hardened resin which extend the interior curved surface of the end section to a circular arc X greater than 180°. These projections 26 serve to locate and maintain the bushings 4 longitudinally and concentrically at the ends of the sidebar. This feature prevents any inadvertent variation in chain pitch such as might be occasioned by slackening of the chain and intrusion of debris between sidebar and bushing.

Referring now to FIG. 8, the connecting pin 3 consists of a cylindrical core 32 having a tight fitting sleeve 36 and a pair of drilled holes 38 at its ends for receiving cotter pins 6. The core 32 is again preferably a composite of a hardened thermoset resin reinforced by high strength filamentary material 34 extending generally longitudinally along the core. In the aforementioned tested embodiment, a core of polyester resin reinforced with continuous glass filaments was made by a pultrusion process. Such a construction provides a very stiff and high shear resistant pin having a modulus of flexure in excess of 1.5 million pounds per square inch.

Because glass fiber reinforced plastic composites generally provide very abrasive surfaces, the sleeve 36 provides a non-abrasive bearing surface for the bushings 4 and roller 5. The sleeve is comprised of a relatively low friction plastic material, which is separately injection molded, placed about the core 32 while still hot, and shrunk upon cooling to a skintight fit with the core. In the tested embodiment, the sleeve 36 is a thermoplastic acetal resin.

As stated before, glass fiber reinforced plastic tends to be very abrasive against other materials because the ends of the glass fibers become exposed on the surface as the softer matrix resin wears away. Therefore, the bushings 4 are provided to isolate the abrasive sidebars 2 from the outer surface of connecting pin 3. The sidebars 2 could be coated or clad with a low friction material, but not only is this a costly step, when the cladding or coating wears away the sidebar would have to be scrapped. Therefore, the use of the separate but inexpensive bushings 4 is a preferred solution to the wear problem.

As shown in FIG. 1, the bushings each consist of a hub 41 and integral annular flange 45. The bore of the bushing 43 is sized to provide a free rotating fit about the outer surface of the sleeve 36 of the connecting pin 3. The hub 41 has an outer diameter sized to provide a snug frictional fit against the inner surface of the curved section 21 of a sidebar 2. If desired, the inner surface of the curved end section 21 of the sidebar can be roughened to enhance the frictional engagement between the bushing and sidebar. This will further insure that the bushing does not rotate in the more abrasive sidebar, which would lead to premature wear of the bushing.

Preferably, the fit between the sidebar section 21 and the hub 41 of the bushing is such as to provide an easy snap fit of the bushing into the sidebar with only slight finger pressure.

It is an important feature of this chain link that the connecting pin 3 rotates freely with respect to all of the sidebars, thus providing for more uniform wear and longer life of all the parts. It will be found that in nearly all prior art chains of this type, and particularly sludge collector chains, the connecting pin is integral with one link or is non-rotatably fixed with respect to at least one set of sidebars. Such arrangements also cause some scuffing and wear on associated sprockets.

The annular flange 45 of the bushing also provides a low friction barrier between the overlapping sidebars of adjacent links as they articulate around a sprocket. The flange is only slightly smaller in diameter than the outside diameter of the curved end section 21 of a sidebar 2. The bushings are placed so that the flange 45 is to the outside of a link such that they, rather than a sidebar 2, provide the contact surface for the cotter pin 6 or other retaining means. This feature prevents the cotter pin from interferring with articulation of the sidebar and from abrading it.

The material of the bushing can also be chosen from a range of materials having low friction properties, but it is preferable that it be different than the material used for the sleeve 36 of the pin 3 so as to avoid the tendency of like materials to weld together. Experience indicates that the material should have a coefficient of friction, when in contact with the pin 3 or roller 5, of less than 0.5. In the referenced tested embodiment a thermoplastic polyester resin was used for the bushings 4 and performed satisfactorily.

The link assembly 10 is intended for transmission chain that is driven by and engages sprockets. The roller 5 is provided to reduce the wear at the interface between the connecting pin of the chain and the sprocket teeth. The roller 5 is tubular in shape having an inside diameter such that it rotates freely about the connecting pin 3, an outer diameter sized according to the associated sprocket configuration, and a length to fit freely, but without excessive lateral play, between the inner pair of sidebars of the assembled chain. The roller should be made of a low friction, but durable material; again preferably different from the material of the pin sleeve 36. Nylon has tested and operated suitably in the referenced practical embodiment of the invention.

The last component of the link assembly of FIGS. 1-5 is the retaining means, which in the illustrated embodiment is a pair of cotter pins 6. A variety of other well known retaining means could be substituted for the exemplary cotter pins; but preferably they should also be of a non-corrodable material such as stainless steel or even plastic.

Figure 2:
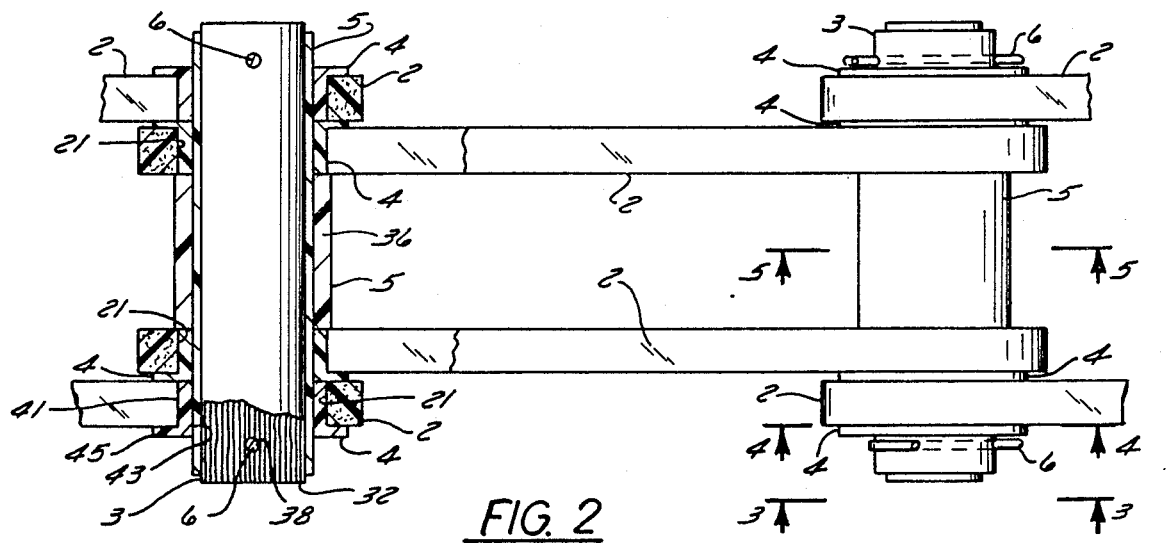
FIG. 2 is a plan view of an assembled chain link, made in accordance with the present invention, connected to the overlapping ends of adjacent like links, with one end of the assembly in cross-section.
Figure 3:
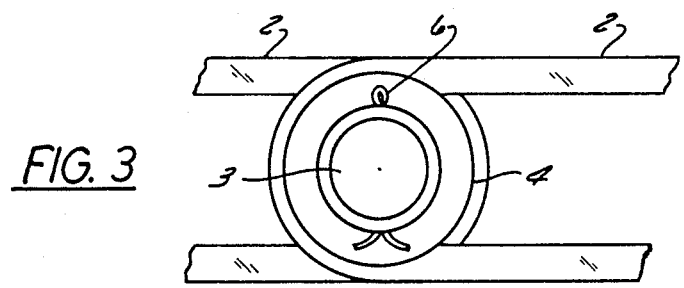
FIG. 3 is a side elevation of the connection between two link assemblies as viewed along the line 3—3 in FIG. 2.
Figure 4:
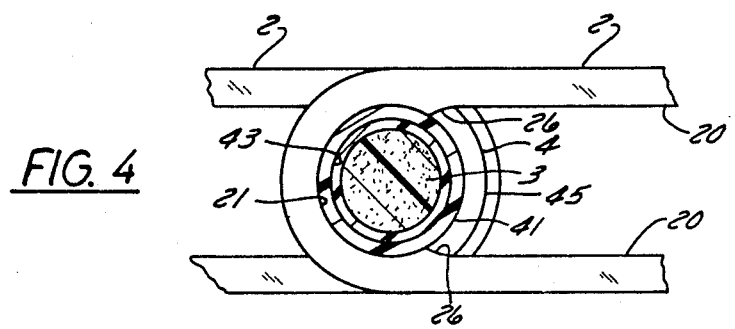
FIG. 4 is a cross-sectional view through the connection between the same two link assemblies as viewed along the lines 4—4 in FIG. 2.
Figure 5:
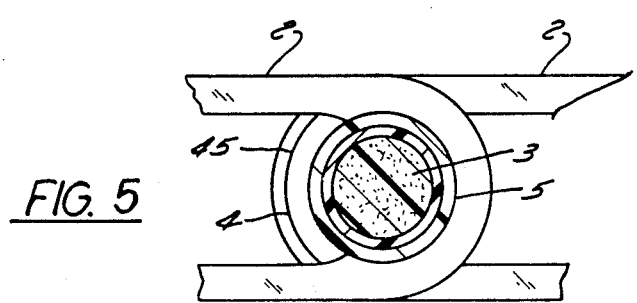
FIG. 5 is a cross-sectional view through the connection between the same two link assemblies as viewed along the lines 5—5 in FIG. 2.

An important feature and advantage of the invention is the ease with which the various components just described can be assembled to make the chain links 10 illustrated in FIGS. 1 and 2. The first step is to insert a bushing 4 at each end of each sidebar 2. Because of the designed moderate press fit and the projections 26, the bushing 4 can be easily located and inserted by hand. Next, two pairs of sidebars 2 are arranged with their ends overlapping, one pair being placed between the other pair. This step is simplified by the fact that the sidebars 2 are symmetrical and end-to-end reversible. A roller 5 is placed between the inner pair of sidebars and a connecting pin 3 passed through the aligned four bushings and roller. Since the fit is free with respect to both the bushings 4 and the roller 5, the pin 3 can be inserted by hand without need of any tool. The assembly is completed by inserting the cotter pins 6 through the holes 38 at the end of connecting pin 3 and expanding their bifurcated ends. This final step is the only one which may require use of a tool; and that being only a pair of conventional pliers or the like. It is conceivable that by using other known retaining means, such as push nuts, or designing readily conceivable new ones, even the need for this tool could be eliminated.

The ease of assembly of these chain links is of valuable benefit to installers or maintenance personnel who may have to make or break a connection under difficult conditions and without the availability of special tools.

But even more important are the improved performance features of the link assembly 10. Paramount among them is the substantially greater pulling strength provided by the unique sidebars 2 in combination with the unique connecting pin 3. The greatly increased tensile strength of the sidebars 2 is complemented by the structure of the connecting pin 3 which, because of its longitudinal or axial reinforcement, has an extremely high modulus of flexure, in excess of 1.5 million PSI. As a result the pin 3 does not readily bend or deform under the high tensile loads, and thus prevents a misalignment of the sidebars which has lead to failure problems in certain prior art chains.

None of the commercially available plastic sludge collector chains of the prior art have shown by test to have an ultimate strength in tension greater than 7,000 lbs. force or rated operating strength greater than about 2,600 lbs. force. However, the chain described above as a practical embodiment of the invention, and which was of comparable size and similar geometry to the prior art chains, has shown by the same test to have an ultimate strength as high as 27,000 lbs. force and consistently well in excess of 20,000 lbs. force. Because of its strength, this chain is expected to have a working rating of 4500 lbs. force, which is comparable to that of some classic cast iron chains. Therefore, unlike the prior art plastic chains, the improved chain can be used in the larger sewage treatment tanks and handle much larger loads in other applications. Also, since the improved chain link is comprised of all lightweight plastic and reinforced plastic composite components, with the possible minor exception of the retaining means, the resulting chain has a very high strength-to-weight ratio which results in further savings in the drives, sprockets and structural support systems used with it.

It is another very important feature of the invention that the continuous taut reinforcement of the sidebars 2 provides greater creep strength and rigidity. This minimizes stretching of the chain during operation under loan and reduces the need for costly and inconvenient adjustments.

It is another important feature of the invention that it facilitates a balanced design. By varying certain dimensional parameters of each component they can all be designed to carry the same design load. This is in contrast to many prior art chains wherein one or more components is overdesigned or unnecessarily strong in relation to the weaker components with which it is associated.

It is still another important benefit of the invention, that owing to the optimized design of each of its components, a chain comprised of links assemblies embodying the invention is expected to have longer economic life than its predecessors. Moreover, because of the use of replaceable, inexpensive wear members to isolate and protect the more costly structural components, the chain link assembly can be easily and economically reconditioned to even further extend the economic life of its principal components. Finally, because the wear members 4 and 5 are sized to rotate freely with respect to the connecting pin 3, and are of low friction materials, this chain link assembly does not require external lubrication.

Since the chain link assembly described hereinabove was especially developed for sludge collector application, FIG. 9 is included to show a link assembly 10' modified to accommodate certain flight attachments A (shown in phantom) which will occur roughly every ten feet in a chain of this type. The attachments A in turn support and propel a flight F which extends lateral to the direction of travel on the order of 10 to 20 feet and is similarly connected to an identical chain on the other side of the sewage treatment tank.

The link assembly 10' is in all ways identical to the other links in the chain and to that shown in FIGS. 1-5, except that in order to accommodate the attachment A the connecting pins 3' are proportionally longer, and the retaining means 6' are outboard of the attachments. As the chain drags the flight F along the floor of a settling tank, the load imposed on the flight is transferred through the attachments A to the very stiff connecting pins 3' and ultimately as pure tensile load on the optimally designed sidebars 2.

The invention has been described in the context of its principal aspects and features and by way of an illustrative embodiment. For example, each component has been discussed in connection with one or two materials which are particularly well suited for that component. However, it is recognized that other materials, particularly resins, currently exist that could meet the requirements, although perhaps at a present cost disadvantage, and that new resins and cost reducing processes for making them are constantly evolving. As these equivalent materials become available at competitive costs, they can be substituted for the specific materials discussed herein.

Other features, embodiments, variations and improvements will undoubtedly occur to these skilled in the art as they build on the teaching of the invention, but those unrecited but obvious variations or modifications of the described embodiment and/or equivalents of specifically recited features and components are also viewed as being within the scope of the claims which follow.

What is claimed is:

1. A lightweight, high strength, non-metallic chain link assembly, comprising:
   a pair of substantially identical sidebars each comprised of a simple flattened loop circumscribing a continuous, uninterrupted open area and having a pair of substantially straight and parallel opposed center sections integrally connected by opposed smoothly curved end sections, and each sidebar being comprised of high strength filamentary material wound tautly in the configuration of said open loop and fixed in a matrix of hardened resin, said matrix of filamentary material and hardened resin being substantially rectangular in cross-section;
   a freely rotatable, stiff, cylindrical connecting pin comprised of a high strength, corrosion resistant material and disposed laterally through the open areas of said pair of sidebars at one of the corresponding ends of said pair of sidebars for connecting said pair of sidebars with an overlapping pair of like sidebars of an adjacent link assembly in a chain;
   friction reducing means comprised of a non-metallic, corrosion resistant material characterized by a low coefficient of friction relative to the material of the pin and sidebars and disposed between said connecting pin and each of said sidebars to permit free relative rotation between said sidebars and said pin, and
   means at the ends of the pin for retaining said link assembly together.

2. A chain link assembly as recited in claim 1, wherein each of said sidebars has a small projection on the inner surface of said loop and adjacent each of said curved ends to form together with said curved end a mechanical retaining means for fixing the position of the connecting pin with respect to the longitudinal axis of said open area.

3. A chain link assembly as recited in claim 2, wherein said retaining means is a bump of resin integral with the resin matrix of said sidebar.

4. A chain link assembly as recited in claim 3, wherein said retaining means comprises a pair of said bumps of resin with one at each intersection of said curved end with a straight center section of the sidebar.

5. A chain link assembly as recited in claim 4, wherein said resin bumps together with the curved end sections form a smooth circular arc on the inner surface of sidebar which is greater than 180 degrees.

6. A chain link assembly as recited in claim 1, wherein each said sidebar is comprised of an uncovered composite of continuous strands of glass filaments and fixed in a matrix of hardened thermoset resin.

7. A chain link assembly as recited in claim 1, wherein said high strength filamentary material is convulutely wound at a substantially zero degree angle of wind with respect to the longitudinal axis of said sidebar.

8. A chain link assembly as recited in claim 1, wherein said resin is from the group of thermoset polyester and epoxy resins.

9. A chain link assembly as recited in claim 1, wherein said connecting pin has a modulus of flexure of at least about 1.5 million pounds per square inch.

10. A chain link assembly as recited in claim 1, wherein said connecting pin further comprises a tight non-slipping outer sleeve of non-abrasive material enveloping a cylindrical core.

11. A chain link assembly as recited in claim 10, wherein said core of said connecting pin is comprised of a fiber or filament reinforced polymer composite having a modulus of flexure of at least 1.5 million pounds per square inch.

12. A chain link assembly as recited in claim 10, wherein said connecting pin is comprised of a core of fiber or filament reinforced resin and an enveloping thin sleeve of low friction plastic material.

13. A chain link assembly as recited in claim 10, wherein said connecting pin comprises a core of hardened resin from the group of thermosetting polyester and expoxy resins which is reinforced by strands of substantially continuous glass filaments extending generally parallel to the longitudinal axis of said core and distributed evenly across the cross-section of said core.

14. A chain link assembly as recited in claim 13, wherein said sleeve is formed separately from said core, placed about said core while at an elevated temperature and shrunk by cooling into tight non-slipping engagement with said core.

15. A chain link assembly as recited in claim 12, wherein said sleeve is comprised of an acetal resin.

16. A chain link assembly as recited in claim 1, further including a tubular roller disposed for free rotation on and about said connecting pin between said sidebars and being of a low friction polymeric material and for the purpose of engaging a sprocket.

17. A chain link assembly as recited in claim 1, wherein said friction reducing means further comprises a separate replaceable thin bushing comprised of low-friction plastic material disposed between said connecting pin and each of said sidebars and wherein said connecting pin is freely rotatable in all of said bushings.

18. A chain link assembly as recited in claim 17, wherein each of said bushings comprises a cylindrical hub positionable between said connecting pin and the inner surface of a sidebar loop and an outwardly extending annular flange positionable between said sidebar and an overlapping sidebar of an adjacent link assembly.

19. A chain link assembly as recited in claim 18, wherein said annular flange of said bushing is always to the outside of the sidebar with respect to the link assembly such that when said sidebar is the outermost on the connecting pin, the link assembly retaining means is separated from contact with said sidebar by said bushing flange.

20. A high strength, non-metallic chain consisting of a string of overlapping and articulately interconnected links each of which comprises:
   a pair of identical sidebars, each comprised of high strength filamentary material convolutely wound into an elongated loop circumscribing a continuous uninterrupted open area and fixed in a matrix of hardened resin, said matrix of filamentary material and hardened resin being substantially rectangular in cross-section and the ends of said loop sidebars being smoothly curved;
   a cylindrical connecting pin of composite non-metallic material extending laterally through the curved ends of the open area in said pair of sidebars and the overlapping curved open ends of the identical sidebars of an adjacent link to articulately connect the sidebars of said two links:
   circular bushings comprised of a low friction plastic material and disposed respectively between each of said sidebars and said connecting pin, said connecting pin being freely rotatable in all of said bushings; and
   means for retaining all of said sidebar ends and bushings between the ends of said connecting pin.

21. A chain as recited in claim 20, wherein the pair of sidebars of one link is disposed between the pair of identical sidebars of the overlapping adjacent link, and wherein the bushing associated with one overlapping set of sidebars includes an outwardly extending annular flange extending between the overlapping articulable surfaces of said set of sidebars.

22. A chain as recited in claim 20, wherein said connecting pin comprises a stiff cylindrical core and a tight non-slipping sleeve of low friction plastic material.

23. A chain as recited in claim 20, wherein each of said sidebars includes integral means for mechanically fixing the position of each bushing associated with it with respect to the longitudinal axis of said chain to insure the proper predetermined pitch between chain links.

24. A chain as recited in claim 22, further including a tubular roller disposed for free rotation on and about the connecting pin between the innermost pair of sidebars and being for the purpose of engaging sprockets associated with said chain.

25. A chain as recited in claim 24 wherein said sleeve of said connecting pin, said bushings and said roller are each of a different low friction plastic material.

26. A chain as recited in claim 20, wherein said sidebars are each comprised of strands of continuous high tensile strength glass filaments tautly wound at a substantially zero degree angle of wind with respect to circumscription of the loop and substantially embedded in an unshielded matrix of hardened resin.

27. A chain as recited in claim 26, wherein said sidebars further include integrally formed bumps of resin proximate the curved ends which serve to fixedly locate the associated bushing for proper chain pitch.

28. A chain as recited in claim 27, wherein said bushings have a snug frictional fit in said sidebars, whereby the connecting pin rotates within the bushing but the bushing does not rotate within the sidebar when the overlapping links articulate at that connection.

29. In a chain link assembly comprising a pair of loop shaped sidebars and a laterally extending connecting pin about which said sidebars can articulate with respect to an overlapping pair of identical sidebars of an adjacent link connected by said pin, and wherein said sidebars and pin are all made of non-corrosive, non-metallic material, the improvement wherein:
   said sidebars circumscribe an uninterrupted open area and are comprised of an unshielded abrasive composite material comprised of high strength filamentary material convolutely wound in the configuration of said open loop and fixed in a matrix of hardened resin, said matrix of filamentary material and hardened resin being substantially rectangular in cross-section;
   and further comprising:
   separate wear reducing means disposed between each of said abrasive sidebars and said connecting pin.

30. The improvement as recited in claim 29, wherein said connection pin consists of a core of hardened resin material reinforced by high strength fiber material enveloped in a tight fitting, non-slipping sleeve of low friction plastic material.

31. The improvement as recited in claim 29, wherein said connecting pin is freely rotatable with respect of all of said sidebars.

32. A lightweight, high strength, non-metallic chain link assembly, comprising:
   a pair of substantially identical sidebars each comprised of a flattened loop circumscribing an open area and having a pair of substantially straight and parallel opposed center sections integrally connected by opposed smoothly curved end sections, and each sidebar being comprised of high strength filamentary material wound tautly in the configuration of said open loop and fixed in a matrix of hardened resin, said matrix of filamentary material and hardened resin being substantially rectangular in cross-section;
   a freely rotatable, stiff, cylindrical connecting pin comprised of a high strength, corrosion resistant material and disposed laterally through the open areas of said pair of sidebars at one of the corresponding ends of said pair of sidebars for connecting said pair of sidebars with an overlapping pair of like sidebars of an adjacent link assembly in a chain.

33. A chain link assembly as set forth in claim 32 wherein each of said sidebars has a projection on the inner surface of said loop and adjacent said one of said corresponding ends of said pair of sidebars to form together with said corresponding ends mechanical retaining means for fixing the position of the cylindrical connecting pin with respect to the sidebars and to restrain the cylindrical connecting pin from movement away from the curved end sections.

34. A chain link assembly as set forth in claim 33 wherein said projections are comprised of resin integral with the resin matrix of said sidebar.

35. A chain link assembly as set forth in claim 32 wherein each of said sidebars is comprised of a composite of continuous strands of glass filaments wound under tension and fixed in a matrix of hardened thermoset resin.

36. A chain link assembly as set forth in claim 35 wherein said connecting pin is comprised of a stiff, high strength cylindrical core comprised of a filament reinforced polymer composite.

37. A chain link assembly as set forth in claim 36 wherein said connecting pin includes a central longitudinal axis and wherein said filament reinforced polymer composite includes filaments of high strength material, said filaments extending substantially parallel to said central longitudinal axis.

* * * * *